Feb. 5, 1935.  W. LINGO  1,990,295
SHOCK ABSORBER STARTING DEVICE
Filed Dec. 11, 1933
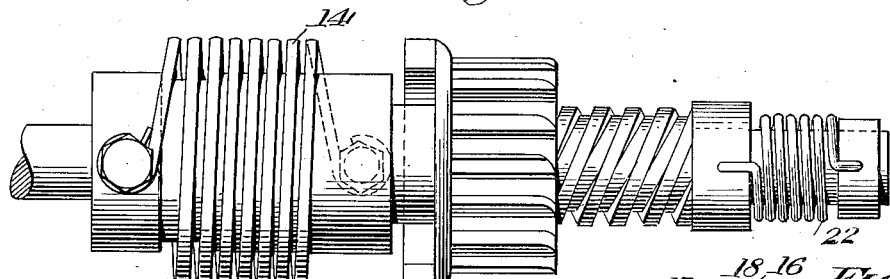
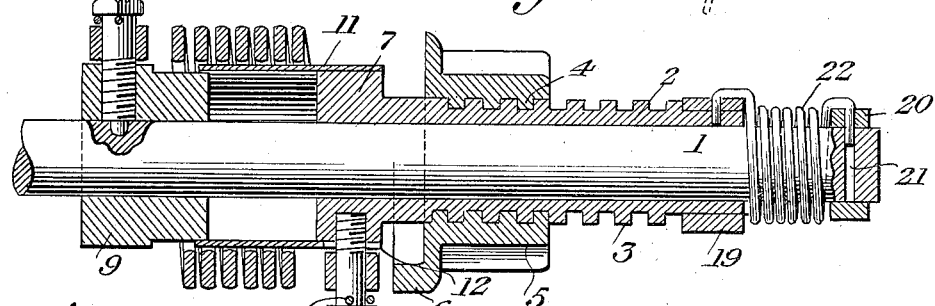
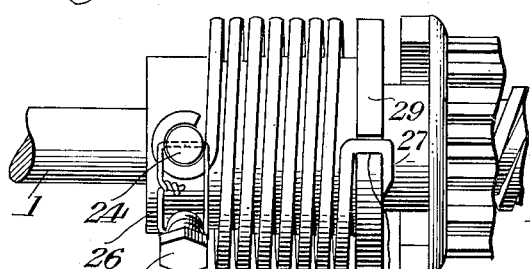
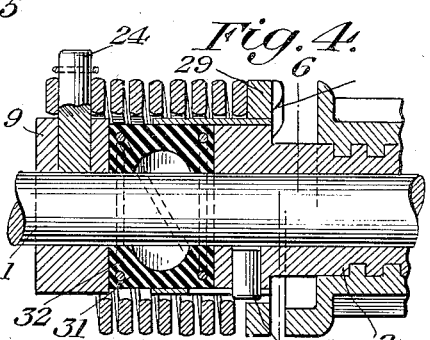
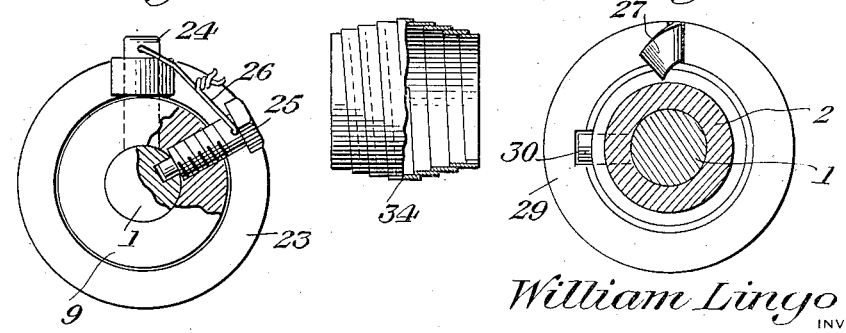
William Lingo
INVENTOR
BY Victor J. Evans & Co.
ATTORNEYS Patented Feb. 5, 1935

1,990,295

UNITED STATES PATENT OFFICE 1,990,295

SHOCK ABSORBER STARTING DEVICE

William Lingo, Pasadena, Calif.

Application December 11, 1933, Serial No. 701,901

3 Claims. (Cl. 74—7)

This invention relates to a shock absorber for starting devices of internal combustion engines and has for the primary object the provision of a device which will efficiently prevent shocks developed by the starting pinion engaging the teeth of the fly wheel of the engine or by the improper engagement of said parts from having damaging effects either to the starter or the engine.

Another object of this invention is the provision of means for reducing to a minimum the possibility of breaking the driving springs employed in starters of the character hereinafter set forth.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a starting device with my invention applied thereto.

Figure 2 is a fragmentary sectional view illustrating the same.

Figure 3 is a fragmentary plan view illustrating a modified means of connecting the driving spring between the starter pinion and the starter shaft.

Figure 4 is a fragmentary vertical sectional view illustrating a modified form of shock absorber located within the driving spring.

Figure 5 is a transverse sectional view illustrating a tie between set bolts of the starter device.

Figure 6 is a transverse sectional view taken on the line 6—6 of Figure 4.

Figure 7 is a plan view partly in section illustrating a cover for the shock absorber.

Figure 8 is a perspective view illustrating a locking pin.

Referring in detail to the drawing, the numeral 1 indicates a starter shaft, forming an integral part of an electrical starting motor (not shown) and has a pinion sleeve 2 slidably and rotatably mounted thereon. The sleeve 2 is provided with the usual feed threads 3 meshing with internal feed threads 4 of a starter pinion 5, the latter being provided with a weighted portion 6 to cause the starter pinion during the initial rotation of the shaft 1 to feed endwise of the sleeve 2 in one direction for the purpose of meshing the teeth thereof with the teeth of the fly wheel of an engine. One end of the sleeve 2 is provided with an enlargement 7 having a screw threaded socket to receive a stud bolt 8. A drive collar 9 is secured to the shaft 1 by a stud bolt 10 and is spaced from the enlargement 7, the latter carrying a sleeve 11 provided with a slot 12 to receive the stud bolt, the opposite end of the sleeve fitting over one end of the collar 9. The stud bolts 8 and 10 are arranged at opposite sides of the shaft 1 and are engaged by the looped ends 13 of a drive spring 14. The spring 14 surrounds the sleeve 11 and is of the coil type having the convolutions thereof slightly spaced and the ends angularly disposed to the end convolutions of the spring. The spring forms a yieldable drive between the shaft 1 and the feed sleeve 2 and by having the convolutions and end portions arranged in the manner described reduces the chances of the spring breaking while under load.

The stud bolts 8 and 10 have apertures 15 to receive locking pins 16, the latter each consisting of a shank 17 and a hook-shaped portion 18. The hook-shaped portion engages about the stud bolt with the end thereof arranged in the aperture of the bolt while the shank 17 extends laterally from the bolt and is bent, as shown in dotted lines in Figure 8, to engage with the end portions of the drive spring 14.

The end of the sleeve 2 from the enlargement 7 has mounted thereon a collar 19 acting as a stop for the movement of the starter pinion in one direction upon the sleeve 2 and is apertured, with said aperture aligning with a socket in the end of the sleeve. A collar 20 is spaced from the collar 19 upon the shaft and is also apertured, the latter aligning with an opening 21 in the shaft. A shock absorbing spring 22 of the coil type is arranged on the shaft 1 between the collars 19 and 20 and has its ends bent into hook-shape to extend through the collars 19 and 20 and also into the socket of the sleeve and the aperture 21 of the shaft thereby anchoring the ends of the springs to the collars and also securing the collars to the sleeve and shaft.

In operation, the starter pinion 5 is fed in one direction of the sleeve 2 by the initial rotation of the shaft 1, this movement being for the purpose of meshing the teeth of the pinion with the teeth on the fly wheel of the engine. However, should the teeth of the starter pinion fail to mesh with the teeth of the fly wheel and thereby limit or retard the full movement of the starter pinion in said direction, the sleeve 2 will yield endwise in a direction opposite to the direction of movement of the starter pinion against the action of the shock absorbing spring 22. The yielding of the sleeve in the direction stated will prevent the teeth of the starter pinion from marring or injuring the teeth upon the fly wheel of the engine. As soon as the teeth of the starter pinion are able to move between the teeth of the fly wheel, the shock absorbing spring returns the sleeve 2 to its initial position.

Referring to my modified form of invention, as shown in Figures 3 to 7, inclusive, the shock absorber is arranged within the driving spring and provides a more compact arrangement than that heretofore described. The driving spring 23 is similarly constructed to the driving spring 14 except that the ends thereof are constructed in a little different manner. One end of the spring 23 is bent to form an open eye to engage a stud bolt 24 threaded to the drive sleeve 9, the latter being secured to the shaft 1 by a set bolt 25. The stud bolts 24 and 25 are anchored together by a tie wire 26. The other end of the spring 23 is bent to form a hook 27, a portion of which lies in a groove 28 formed on a flange 29 of the sleeve 2, the remaining portion of the hook 27 engaging a socket formed in one side of the flange 29 and is separate from the head of the sleeve 2 and is secured to said head by a member 30.

A cushion block or element 31 is mounted on the shaft 1 between the drive collar 9 and the head of the sleeve 2 and may be constructed of any material suitable for the purpose and preferably has embedded therein a reinforcing element 32. The element or member 31 provides the shock absorbing means, being the equivalent in operation to the spring 22 of the heretofore described form of my invention. A sleeve 33 similarly constructed to the sleeve 11 fits partially over the shock absorbing element 31 and lies between the latter and the drive spring 23 and is slotted to accommodate the connecting element or member 30. Should the starter pinion fail to mesh with the teeth on the fly wheel of the engine, the sleeve 2 moves endwise of the shaft 1 against the cushion block 31 permitting the latter to absorb the shock and prevent such shock from being transmitted to the starter.

Instead of employing the sleeve 33, a covering 34 may be employed consisting of a coiled element having the convolutions thereof slightly overlapped, as shown in Figure 7.

The cushion element 31 may be substituted by a cushioning spring of the coiled type located between and connected to the members 2 and 9.

Having described the invention, I claim:

1. A starting device including a starter shaft and a starter pinion, a feed sleeve for the starter pinion and mounted on the shaft, a head formed on said sleeve, a drive collar secured to the shaft and spaced from the head, a flange secured to said head, a drive spring between the flange and the drive collar, and a cushion block mounted on the shaft between the head and the drive collar to provide a shock absorber.

2. A starting device including a starter shaft and a starter pinion, a feed sleeve for the starter pinion and mounted on the shaft, a head formed on said sleeve, a drive collar secured to the shaft and spaced from the head, a flange secured to said head, a drive spring between the flange and the drive collar, a cushion block mounted on the shaft between the head and the drive collar to provide a shock absorber, and reinforcing means embedded in the block.

3. A starting device including a starter shaft and a starter pinion, a feed sleeve for the starter pinion and mounted on the shaft, a head formed on said sleeve, a drive collar secured to the shaft and spaced from the head, a flange secured to said head, a drive spring between the flange and the drive collar, a cushion block mounted on the shaft between the head and the drive collar to provide a shock absorber, reinforcing means embedded in the block, and a protecting element carried by the head and overlying a portion of the block and underlying a portion of the drive spring.

WILLIAM LINGO.